(12) United States Patent
Takada et al.

(10) Patent No.: US 6,210,825 B1
(45) Date of Patent: Apr. 3, 2001

(54) SAFETY VALVE ELEMENT FOR BATTERY AND BATTERY CASE CAP WITH SAFETY VALVE

(75) Inventors: Akiyoshi Takada, Shiga-ken; Akira Takagi, Kyoto; Kinji Saijo, Yamaguchi-ken; Kazuo Yoshida, Yamaguchi-ken; Nobuyuki Yoshimoto, Yamaguchi-ken; Yoshihiko Isobe, Yamaguchi-ken, all of (JP)

(73) Assignees: Toyo Kohan., LTD, Tokyo; Fukada Metal Foil & Powder Co., Ltd., Kyoto, both of (JP)

( * ) Notice: Subject to any disclaimer, the term of this patent is extended or adjusted under 35 U.S.C. 154(b) by 0 days.

(21) Appl. No.: 09/125,261
(22) PCT Filed: Feb. 14, 1997
(86) PCT No.: PCT/JP97/00388
  § 371 Date: Aug. 12, 1998
  § 102(e) Date: Aug. 12, 1998
(87) PCT Pub. No.: WO97/30482
  PCT Pub. Date: Aug. 21, 1997

(30) Foreign Application Priority Data

Feb. 15, 1996 (JP) .................................................. 8-050780

(51) Int. Cl.[7] .................................................. H01M 2/12
(52) U.S. Cl. .................................................. 429/56; 429/53
(58) Field of Search .................. 429/53, 56; H01M 2/12

(56) References Cited

FOREIGN PATENT DOCUMENTS

| | | |
|---|---|---|
| 93-314959 | * 11/1993 | (JP) . |
| 7130346 | * 5/1995 | (JP) . |
| 96-17416 | * 1/1996 | (JP) . |

* cited by examiner

Primary Examiner—John S. Maples
(74) Attorney, Agent, or Firm—Browdy and Neimark

(57) ABSTRACT

A safety valve element for battery use which ruptures at a stable pressure range so as to release the inner pressure of the battery is disclosed. The safety valve element for battery use comprises a metal substrate which is provided with a perforated opening and a metal foil laminated on the metal substrate so as to close the perforated opening. A battery which is provided with such a safety valve is also disclosed. A battery case provided with such a safety valve is also disclosed. The battery and the battery case lid is produced by forming the perforated opening in the metal substrate, pressure welding the metal foil to the metal substrate and molding the clad material into a form of the battery case lid.

14 Claims, 2 Drawing Sheets

SAFETY VALVE ELEMENT FOR BATTERY AND BATTERY CASE CAP WITH SAFETY VALVE

FIELD OF THE INVENTION

The present invention relates to especially safety valve elements for battery use, battery case lids provided with safety valves and batteries produced by employing such safety valve elements and battery case lids.

DESCRIPTION OF RELATED ART

Conventionally, batteries which use an alkali metal such as lithium, sodium or potassium as an active material on negative electrode thereof sometimes suffer from rupture when the pressure in the batteries becomes abnormally elevated. To prevent the occurrence of such a rupture, safety valves which can release the pressure outside when the pressure in the battery reaches an excessive level have been requested and accordingly various safety valves having different mechanisms have been proposed. To assure the safety in which even when the battery ruptures by a chance, broken pieces or contents of the battery do not scatter outside and cause no damage especially to personnel, the batteries must be operated at a low pressure of not more than 30 kgf/cm$^2$.

The dry-cell type battery which uses an alkali metal as the active material negative electrode is further required to have a high sealability. A Japanese laid-open publication SHO 63-285859 discloses a safety valve which can release the inner pressure of such a battery to the outside. In this battery, a part of the wall of the battery vessel is made thin by cold rolling using a press until the thickness of the rolled part becomes half of the original thickness of the part. Accordingly, when the inner pressure reaches a predetermined elevated inner pressure, the thinned wall part is ruptured and the inner pressure is released to the exterior of the battery vasel.

To release the inner pressure at a low pressure of not more than 30 kgf/cm$^2$, the thinned wall part must be made considerably thin. Accordingly, during the press working to obtain the extremely thin wall part, fine or minute cracks may occur, and once such cracks occur, the sealability of the vessel is spoiled. Although the thinned wall part is hardened with such a press working, the hardening does not occur uniformly. Accordingly, the release valve disclosed in Japanese laid-open publication SHO 63-285859 also suffers from a drawback that even when the thinned wall part is pressed to have a uniform thickness, the thinned wall part does not always rupture at the selected predetermined pressure.

Furthermore, although an etching method has been proposed to make a part of the wall of the battery vessel thin, it is extremely difficult to control the thickness of the thinned wall part after etching and the thinned wall part is apt to suffer from pin holes. Accordingly, thinned wall parts of all battery vessels must be subject to a pin hole test for detecting the presence of pin holes.

In this manner, with the above-mentioned method, it is extremely difficult to provide the thinned wall part which has a uniform thickness so that especially on the condition that the safety valves are to be operated to release pressure at a low pressure of not more than 30 kgf/cm$^2$, a reliable reproductivity of the pressure releasing operation cannot be achieved.

To resolve the drawbacks of the above-mentioned methods, Japanese laid-open publication HEI 5-314959 discloses a method in which one metal plate having a perforated opening and the other thin metal plate are clad with each other to produce a thinned wall part having a uniform thickness and such a method provides a valve operating pressure which is not more than 30 kgf/cm$^2$ and has a reliable reproductivity on a pressure releasing operation.

In this method, however, since the perforated metal plate and the thinned metal plate are heated in a vacuum furnace and heat-sealed with each other under pressure, the materials for these metal plates must meet a condition that they can be heat-sealed under pressure. Namely, the materials for these metal plates are restricted to the same metals or metals having similar physical properties such as a similar melting point. In Japanese laid-open publication HEI 5-314959, stainless steel, iron, nickel and the like are proposed as preferable materials for these metal plates.

Furthermore, to heat seal these metal plates under pressure to obtain a uniform adhering strength, an oxide film formed on the surface of these metal plates must be removed by buffing or the like and then the metal plates must be heated at a high temperature of approximately 1000° C. so the method necessitates a sophisticated operation and facilities. Furthermore, these thin metal plates are usually produced by a cold rolling so that they are subjected to hardening by working. Since the above-mentioned metal plates are hardened by working, they are annealed at a high temperature during the heat sealing under pressure so that the mechanical strength of these metal plates differs before and after the heat sealing operation. Accordingly, the properties of the materials before heat sealing, the heating temperature and the heating time have to be strictly controlled to make the mechanical strength (the limit strength which causes a rupture as the inner pressure is elevated) of the metal plates constant after heat sealing.

SUMMARY OF THE INVENTION

Accordingly, it is an object of the present invention to provide safety valve elements which rupture precisely at a predetermined pressure in a low pressure range and can be manufactured readily.

It is another object of the present invention to provide battery case lids which are provided with such safety valve elements.

It is still another object of the present invention to provide batteries which incorporate such safety valve elements and such battery case lids.

The safety valve element according to the present invention comprises a metal substrate which is provided with a perforated opening and a metal foil which is stacked on the metal substrate to close the perforated opening. The safety valve element may preferably be provided with a plurality of perforated openings. The metal substrate may be made of one selected from a group consisting of a steel plate, stainless steel plate, copper plate and aluminum plate. The metal foil may be made of one selected from a group consisting of a steel foil, stainless steel foil, copper foil, aluminum foil, nickel foil, and nickel-iron alloy foil.

The battery case lid which is provided with the safety valve element may preferably be produced by forming a perforated opening on the metal substrate, pressure welding the metal foil to the metal substrate so as to close the perforated opening and molding the metal substrate into a case lid form.

The battery may preferably be provided with either the safety valve element or the battery case lid provided with the above-mentioned safety value.

DETAILED DESCRIPTION OF THE PREFERRED EMBODIMENT

The safety valve elements, the battery case lids provided with the safety valve elements and the battery which incorporate the safety valve elements or the battery case lids according to the present invention is hereinafter explained in detail in conjunction with attached drawings.

Figure 1:
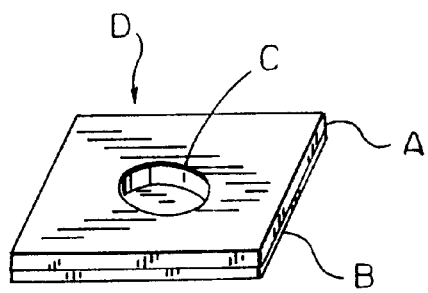
FIG. 1 is a schematic perspective view of a safety valve element for battery use according to the present invention.

As shown in FIG. 1, a safety valve element D according to the present invention has a laminar sheet-like construction and is made of a metal substrate A and a metal foil B which is mounted on the metal substrate A. The metal substrate A is provided with a perforated opening C. The safety valve elements D can be produced from a composite clad material 19 as will be described later.

The safety valve elements D according to the present invention is predetermined to be operated at a low pressure of not more than 30 kgf/cm$^2$, or preferably, at a pressure of not more than 20 kgf/cm$^2$. To achieve this objective, the metal foil B used for the present invention should have a thickness of 5 to 50 μm corresponding to the kind of metal of the metal foil B. In the case that the thickness of the metal foil B is less than 5 μm, if the safety valve element D is mounted on the battery as the safety valve, the metal foil B readily ruptures when it is dropped on a working table or the like. In the case that the thickness of the metal foil B is more than 50 μm, even when the metal foil B is made of a metal having a low rupture strength, if the safety valve element D is mounted on the battery as the safety valve, the metal foil B does not rupture at a pressure below 30 kgf/cm$^2$ and ruptures when a pressure far exceeding 30 kgf/cm$^2$ is applied to the metal foil B. Accordingly, when the vessel ruptures as the inner pressure thereof is elevated, broken pieces are scattered and the content also is spilled outside thus causing a damage to people nearby. Furthermore, the use of such safety valve elements D having thick metal foil B is not favorable in terms of the manufacturing cost of the batteries.

In the case that the metal foil B is used as the safety valve element D of the battery, the kinds of metal foil B should preferably be steel foil, stainless steel foil, copper foil, aluminum foil, nickel foil and nickel-iron alloy foil since the metal foil B is required to have a favorable corrosion resistance against alkaline aqueous solution of electrolyte.

In the case that the metal foil B is used for usages other than batteries, any kinds of metal foil B can be used on the condition that the metal foil B shows a stability against a content filled in a vessel, causes no corrosion and does not produce a considerable amount of reaction gas. Namely, the metal foil B can be made of zinc, lead, copper alloys such brass, bronze, phosphor bronze, gun metal or monel metal, and aluminum alloy such as duralmin besides materials as mentioned previously.

Although the metal foil B can be produced in any known methods, the metal foil B is generally produced by thinning a strip by a cold rolling or by further annealing the cold rolled strip.

Although the thickness of metal sheet used for metal substrate A is not specifically limited, it should be 0.03 to 0.50 mm usually and preferabaly 0.05 to 0.10 mm in view of the strength, economy and for facilitating welding or calking the safety valve to the vessel.

In the case that the metal substrate A is used for the safety valve element D which is made of two metal pieces, namely, the metal foil B and the metal substrate A, if the metal substrate A directly comes into contact with alkaline aqueous solution of electrolyte, the kinds of metal substrate A should preferably be steel plate, stainless steel plate, copper plate, nickel plate and nickel-iron alloy plate since the metal substrate A is required to have a favorable corrosion resistance against alkaline aqueous solution of electrolyte.

In case that the metal substrate A does not directly come into contact with alkaline aqueous solution, since the metal substrate A does not have to have a favorable corrosion resistance against alkaline aqueous solution, any metal plate can be used on the condition that the metal substrate A is stable against a content filled in the vessel, and the performance of the battery is not deteriorated, and a reaction gas is not generated in a considerable amount.

The object of the present invention can be achieved even when the kind of metal foil B is different from the kind of the metal substrates A.

Furthermore, although the above-mentioned metal substrate A can be produced by any methods, in general, the metal plate which is thinned by the cold rolling is directly used as the metal substrate A or the metal plate which is produced by annealing the thinned metal plate after cold rolling is used.

The metal substrate A is provided with at least one perforated opening C. The size and shape of the perforated opening C differ corresponding to the size and shape of the vessel on which the safety valve element D is mounted. Accordingly, there is no restriction on the size and shape of the perforated opening C. In general, the perforated opening C should preferably be of a circular shape having a diameter of 1 to 10 mm. The perforated opening C can be of an elliptical shape having a longitudinal axis length of 1 to 10 mm or of a polygonal shape having a diagonal length which corresponds to the diameter of the above-mentioned circular shape.

The shape of the perforated opening C can be a section of a line such as a straight or curved slit having a desired width.

The shape of the perforated opening C can be a geometrical pattern which is a combination of several kinds of above-mentioned figures.

The perforated opening C is formed by punching a cold-rolled thin plate produced by means of a punching press.

In the case that a plurality of perforated openings C are formed in the metal substrates A, these perforated openings C are preferably arranged in a geometrical manner such as a lattice-like pattern or a zigzaging pattern. The pitch or interval between the perforated openings C is determined in a desired manner in view of the size of the safety valve member. Although the manner of forming such perforated openings is not restricted specifically, the perforated openings can be formed in conventional manners such as punching out the metal substrate A with a punching press or an etching method.

Furthermore, one safety valve element D for battery use may be provided with a plurality of perforated openings C. The safety valve element D may also be produced by adhering the metal foils B on both sides of the metal substrate A. In this case, even when one one metal foil B adhered on one surface of the metal substrate A is broken, so long as the other metal foil B adhered to the other surface of the metal substrate A is not broken, the function of the safety valve can be assured.

Figure 2:
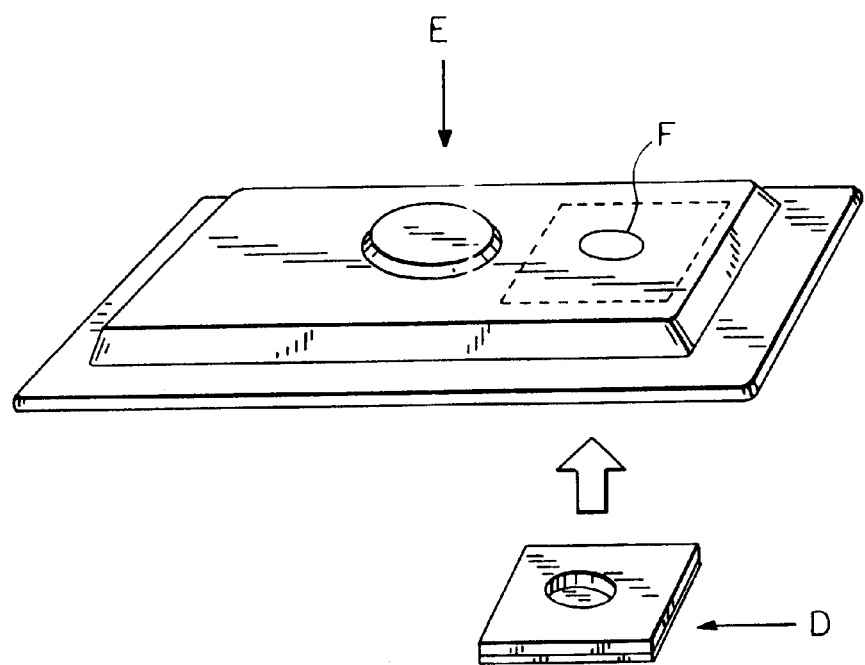
FIG. 2 is a schematic perspective view showing the manner of mounting the safety valve element to a battery case lid according to the present invention.

In FIG. 2, the manner of mounting the safety valve element D to a battery case lid E is shown. The battery case lid E is previously provided with an opening F and the safety valve element D is mounted on the bottom of the battery case lid E. The periphery of the safety valve element D is fused by laser beams and is welded to the battery case lid E in such a manner that the safety valve element D hermetically closes the opening F.

Although, as described above, the safety valve element D for battery use is usually mounted on the vessel by welding in such a manner that the safety valve element D closes an opening which is formed in a part of the vessel of the battery, it is possible to form the battery case lid E directly from a metal substrate A having a thickness greater than that of the ordinary metal substrate A, wherein a perforated opening F is formed in the metal substrate and then a metal foil is welded to the metal substrate to close the opening F and then the metal substrate is molded to the battery lid case E. In this case, the metal foil supports the entire bottom surface of the battery case lid E.

The metal foil B and the metal substrate A provided with perforated apertures C are pressure welded by a cold rolling in a vacuum, for example, by a method disclosed in Japanese laid-open patent publication HEI 1-224184.

Figure 3:
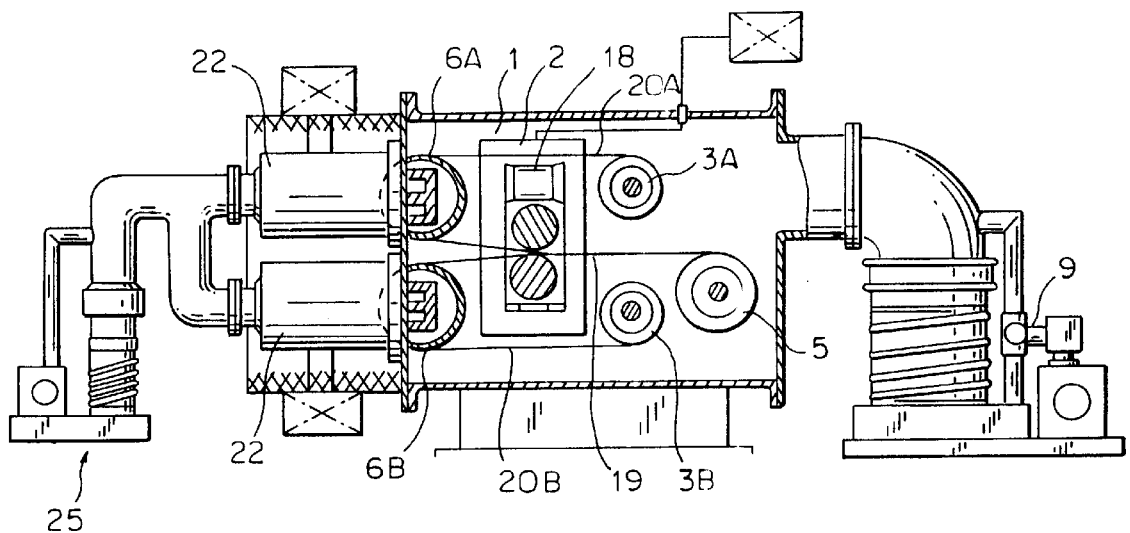
FIG. 3 is a schematic perspective view showing the manner of producing the composite material.
Figure 4:
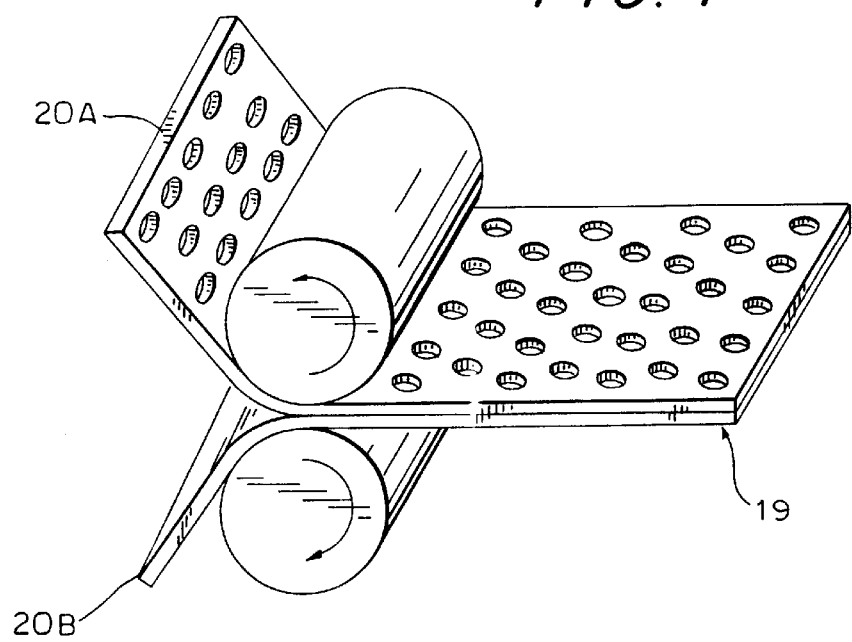
FIG. 4 is a schematic perspective view showing the manner of producing the composite material.

In FIG. 3 and FIG. 4, an apparatus for producing the composite material 19 by pressure welding a metal foil 20B and a metal substrate 20A making use of a cold rolling is shown in a partial cross section. As shown in these drawings, the metal substrate 20A and the metal foil 20B which are respectively reeled out from uncoilers 3A, 3B are wound around electrode rolls 6A, 6B which have portions thereof protruding toward an etching chamber 22 and then they are subjected to a sputtering treatment so as to be activated. Subsequently, the metal substrate 20A and the metal foil 20B are subjected to a cold rolling by a rolling unit 2 mounted in the vacuum chamber 1 thus producing the composite material 19 which, in turn, is wound around a coiler 5. The rolling unit 2 is provided with a rolling reduction device 18 for descending the roll. The vacuum level in the vacuum chamber 1 is held in a range of $10^{-3}$ to $10^{-6}$ Torr by a large-sized vacuum pump 9.

In the production of the composite material 19, a magnetron sputtering method is employed for activating the metal foil 20B and the metal substrate 20A and a high frequency power source having a frequency range of 1 to 50 MHz is employed as a power source for sputtering. In the case that the frequency is less than 1 MHz, it is difficult for the high frequency power source to assure a stable glow discharge so that a continuous etching is not achieved, while in the case that the frequency is more than 50 MHz, the high frequency power source apts to oscillate so that the power supply system becomes unpreferably complicated.

For starting the etching operation, preliminarily, the vacuum level in the etching chamber 22 has to be held not more than $1\times10^{-4}$ Torr by means of a vaccum pump (an air exahust pump) 25 and argon gas is charged into the etching chamber 22 so as to produce an argon gas atmosphere with a vacuum level of $10^{-1}$ to $10^{-4}$ Torr. Then, a high frequency current is supplied between the etching chamber 22 and the vacuum chamber 1, plasma is generated and the surface of the metal foil 20B and the surface of the metal substrate 20A are both subjected to etching.

In the case that the presssure of argon gas is below $1\times10^{-4}$ Torr, it is difficult to assure the stable glow discharge and a high ion flow is not obtained so that a high speed etching becomes difficult. On the other hand, in the case that the pressure of argon gas exceeds $1\times10^{-1}$ Torr, the average free path of the sputtered atoms becomes short so that the frequency that the sputtered atoms are shot again to the target is increased. Namely, oxygens which are separated from the oxide formed on the surfaces of the metal foil and the metal substrate by etching are again shot to the target so that the efficiency of surface activating treatment is deteriorated. Accordingly, the pressure of argon gas in the etching chamber 22 should be in a range of $10^{-1}$ to $10^{-4}$ Torr.

With the use the magnetron sputtering method in the production of composite material 19, an etching speed of more than 1000 angstrom/min can be obtained so that even a stable and thick oxide film formed on the aluminum and titanium can be completely removed in a few minutes. The oxide film formed on the surface of copper, steel, stainless steel and amorphous metal can exhibit clean surface by etching for a few seconds.

Although the lowering of vacuum level in the vacuum chamber 1 lowers the welding strength of the metal foil 20B with the metal substrate 20A, the allowable lower limit of the vacuum level should be $1\times10^{-1}$ Torr in view of industrial economy, while the upper limit should be $1\times10^{-3}$ Torr since this vacuum level still assures a sufficient welding strength.

Furthermore, in the production of the composite material 19, it is unnecessary to heat the metal foil 20B and the metal substrate 20A during the cold rolling. Namely, in the cold rolling, there is no problem even if the temperature T of these metals 20A, 20B at the time of gripping them between rolls is held at a room temperature. However, if it becomes necessary to heat the metal foil 20B and the metal substrate 20A during the cold rolling in view of decreasing the difference of the thermal expansion rates of these metals caused by heat generated at the time of rolling and accompanying deformation of these metals 20A, 20B after being cooled, the upper limit of heating should be in a range of, preferably not more than 300° C. so as to prevent the occurrence of recrystallizing annealing and generation of an alloy layer or carbide which deteriorates the welding strength between these metals 20A, 20B.

The rolling reduction rate at the time of cold rolling the metal foil 20B and the metal substrate 20A should preferably be 0.1 to 30%. Namely, cold rolling should be carried out with the rolling reduction rate which falls in a range expressed as follows.

$$0.1 \leq R \leq 30$$

wherein, $R=(T1+T2-TA)\times100/(T1+T2)$ (%)

T1: thickness of metal foil before pressure welding
T2: thickness of metal substrate before pressure welding
TA: thickness of composite material after cold rolling
R: rolling reduction rate (%)

The lower limit of the rolling reduction rate is determined by following factors. Namely, although the surface of the plate appears flat at a glance, there are many fine or minute irregularities or indentations in a microscopic level and metals come into contact with each other with an extremely insufficient contact area if pressure is not applied to them and under a conventional cold rolling welding method, a strong welding cannot be obtained even if the surfaces of these metals are sufficiently activated. Accordingly, in the conventional cold rolling welding method, the oxide film on the surfaces of these metals are subjected to a plastic flow by cold rolling with a high rolling reduction rate so that the surfaces of the metals are partially activated and the contact area is increased and then the metals are welded each other. In such a method, the surfaces of the metals are not necessarily flat. Namely, the metal substrate is preliminarily finished at a reasonable roughness and then is subjected to the cold rolling with a high rolling reduction rate to make the surfaces flat and smooth.

On the other hand, in purifying the surfaces of the metal foil 20B and the metal substrate 20A by the method for producing composite material 19, no new irregularities or indentations are formed on the surfaces of the metal foil 20B and the metal substrate 20A. Then, the metal foil 20B and the metal substrate 20A can be pressure welded while keeping a surface flatness at the time of finish rolling carried out before pressure welding. Accordingly, even with a small pressure, a sufficient contact area is obtained and a metallic bonding steadily takes place on the contact portions so that a strong adhering strength is obtained even with the small rolling reduction rate.

Considering a case that the plate is subjected to a cold rolling and a finishing rolling or to a refining rolling in one rolling step, the upper limit of the rolling reduction rate is determined to be 30%. It is not desirable that the rolling reduction rate exceeds 30% since such a rolling rate gives rise to an extremely high work hardness. For pressure welding the metal foil 20B and the metal substrate 20A in a cold rolling, in place of rolling roll, a pressurizing mechanism such as a press which is provided with a flat block at one side thereof or flat blocks at both sides thereof can be used.

The present invention is further explained in conjunction with following preferred examples.

EXAMPLE 1

A multiplicity of circular perforated openings having a diameter of 3 mm were formed on the cold rolled steel plate having a thickness of 90 $\mu$m in a lattice pattern by means of a punching press, wherein a pitch between openings was determined to be 10 mm. A nickel plating having a thickness of 2 $\mu$m was applied to both surfaces of the perforated steel plate by means of a Watt bath to produce a metal substrate.

This metal substrate and an aluminum foil having a thickness of 30 $\mu$m were inserted into a vacuum chamber of an argon gas atmosphere having a vacuum level of 5×10$^{-3}$ Torr so as to provide an etching of approximately 500 angstrom on one surface of the metal substrate and an etching of approximately 2000 angstrom on the corresponding one surface of the aluminum foil by the magnetron sputtering method. Subsequently, the metal substrate and the aluminum foil were laminated in a manner that the etched surfaces of them are contacting each other and pressure welded by a cold rolling at a temperature of 120° C. and with a rolling reduction rate of 3% to produce a or a composite material. A multiplicity of safety valve elements for a battery use were punched from the composite material, wherein each valve element was of a rectangular shape having a longitudinal length of 10.5 mm and a lateral width of 7.5 mm and was provided with a circular opening at the center thereof.

The periphery of each valve element for a battery use was fused by laser beams and was welded to a steel-made pressure vessel in such a manner that the valve element hermetically closed a perforated opening formed in the pressure vessel.

Then a edge part of the steel-made pressure vessel was connected with an air compressor by way of a pressure gauge and the inside of the steel-made pressure vessel was pressurized. When the inner pressure of the steel-made pressure vessel reached 14 kgf/cm$^2$, the aluminum foil of the safety valve element for a battery use ruptured.

Thereafter, several safety valve elements for a battery use were produced in the same manner and the pressures which caused a rupture on respective aluminum foil was respectively measured. The pressure test showed that aluminum foils of all safety valve elements for a battery use ruptured at pressures which fall in a stable pressure range of 12 to 18 kgf/cm$^2$.

COMPARATIVE EXAMPLE 1

On one side of an aluminum plate which was preliminarily rolled to a thickness of 0.2 mm, a half etching with intervals of 0.1 mm was provided at a plurality of circular portions thereof each having a diameter of 3 mm until the remaining thickness of the circular portions became approximately 30 $\mu$m. A plurality of safety valves which were provided with half-etched circular portion were produced by punching the aluminum plate in the same manner as that of the example 1. These safety valve elements were hermetically welded to a steel-made pressure vessels in the same manner as that of the example 1. Then, the steel-made pressure vessels were pressurized in the same manner as that of the example 1. The half-etched portions of the safety valve elements ruptured in a relatively wide range of 6 to 24 kgf/cm$^2$.

EXAMPLE 2

A multiplicity of circular perforated openings having a diameter of 3 mm were formed on a stainless steel plate rolled by a cold rolling and having a thickness of 60 $\mu$m in a lattice pattern by means of a punching press, wherein a pitch between openings was determined to be 10.5 mm. This perforated cold-rolled stainless steel plate and a nickel foil having a thickness of 10 $\mu$m were inserted into a vacuum chamber of an argon gas atmosphere having a vacuum level of 1×10$^{-2}$ Torr so as to provide an etching of approximately 500 angstrom on one surface of the cold-rolled and perforated stainless steel plate and an etching of approximately 500 angstrom on the corresponding one surface of the nickel foil by the magnetron sputtering method. Subsequently, the etched surfaces of the cold-rolled and perforated stainless steel plate and the nickel foil were laminated and both plate and foil were pressure welded by a cold rolling at a room temperature and with a rolling reduction rate of 0.5% to produce a composite material. Seven safety valve elements for a battery use were punched from the composite material, wherein each valve element was of a rectangular shape having a longitudinal length of 10.5 mm and a lateral width of 7.5 mm and was provided with a circular opening at the center thereof.

These valve elements for a battery use were hermetically welded to a steel-made pressure vessels in the same manner as that of the example 1. Then, the inside of each steel-made pressure vessel was pressurized in the same manner as that of the example 1, and as a result, the nickel foils of seven safety valve elements for a battery use ruptured in a stable pressure range of 13 to 17 kgf/cm$^2$.

COMPARATIVE EXAMPLE 2

On one side of a thinned nickel plate which is produced by a rolling and has a thickness of 0.1 mm, a plurality of circular dents having a diameter of 3 mm were formed in a lattice pattern with intervals of approximately 10.5 mm, wherein each dent has a remaining plate thickness of approximately 10 μm. Seven safety valve elements for a battery use each having the circular dents at the center thereof were produced in the same manner as that of the example 1.

These valve elements for a battery use were hermetically welded to steel-made pressure vessels in the same manner as that of the example 1. Then, the inside of each steel-made pressure vessel was pressurized in the same manner as that of the example 1, and as a result, three valve elements for a battery use already had micro or minute cracks at the time of press working so that the inner pressure was not elevated, while the remaining four safety valve elements for a battery use ruptured their dents at pressures which fell in a wide range of 8 to 33 kgf/cm$^2$.

EXAMPLE 3

A multiplicity of circular perforated openings having a diameter of 3 mm were formed on the cold rolled steel plate having a thickness of 90 μm in a zigzaging pattern by means of a punching press, wherein a pitch between openings was determined to be 10.5 mm. A nickel plating having a thickness of 2 μm was applied to both surfaces of the cold rolled steel plate in the same manner as that of the example 1.

This nickel-plated and perforated steel plate and a copper foil having a thickness of 10 μm were inserted into a vacuum chamber of an argon gas atmosphere having a vacuum level of $2 \times 10^{-3}$ Torr so as to provide an etching of approximately 500 angstrom on one surface of the nickel plated steel plate and an etching of approximately 500 angstrom on the corresponding one surface of the copper foil by the magnetron sputtering method. Subsequently, the etched surfaces of the nickel plated steel plate and the copper foil were laminated and pressure welded by a cold rolling at a room temperature and with a rolling reduction rate of 0.3% to produce a composite material. Seven safety valve elements for a battery use were punched from the composite material, wherein each valve element was of a circular shape having a diameter of 10.5 mm and was provided with a circular opening at the center thereof.

These safety valve elements for a battery use were hermetically welded to a steel-made pressure vessels in the same manner as that of the example 1. Then, the inside of each steel-made pressure vessel was pressurized in the same manner as that of the example 1, as a result the copper foils of these safety valve elements ruptured in a stable pressure range of 10 to 15 kgf/cm$^2$.

COMPARATIVE EXAMPLE 3

In a nickel-plated steel plate which was produced in the same manner as that of the example 3, a multiplicity of circular openings were formed in a zigzaging pattern in the same manner as that of the example 3. This nickel-plated steel plate and a copper foil similar to that of the example 3 were laminated and heat sealed under pressure in a vacuum furnace at a temperature of 1000° C. Seven safety valve elements each having a circular dent at the center thereof were produced from this laminated plate. After hermetically welding these safety valve elements to steel-made pressure vessels, the inside of each steel-made pressure vessel was pressurized, and as a result the nickel foils of these safety valve elements ruptured in a wide pressure range of 4 to 12 kgf/cm$^2$.

As has been described heretofore, the safety valve element for a battery use according to the present invention can readily provide a rupture portion having a uniform thickness so that the irregularity on inner pressure which causes rupture can be minimized. Accordingly, when such a safety valve element for a battery use is used as a safety valve of various kinds of pressure vessels or the like, they can be reliably operated with its stable operating pressure.

Furthermore, according to the present invention, the composite material is produced using a cold pressure welding so that the lowering of the strength of material can be minimized compared to that by the conventional high temperature heat molding method thus realizing a stable operating pressure of the safety valve element for a battery use.

Furthermore, the battery case lid according to the present invention can be molded after forming a perforated opening in the metal substrate therein and pressure welding the metal foil to the metal substrate so that the battery case lid provided with the safety valve which works as a rupture portion can be readily produced and when the battery case lid is used actually as a lid of various kinds of battery case, the safety valve element can be reliably operated with its stable operating pressure.

Still furthermore, the battery provided with the safety valve element according to the present invention is operated with a stable operating pressure thus assuring an optimum safety.

What is claimed is:

1. A safety valve element for battery use consisting of a composite material of a metal substrate which is provided with a perforated opening and metal foil stacked with surfaces facing one another, and pressure welded substantially entirely along said facing surfaces thereof by cold rolling in a vacuum on said metal substrate so as to close said perforated opening.

2. A safety valve element for battery use according to claim 1, wherein a plurality of perforated openings are formed in said metal substrate.

3. A safety valve element for battery use according to claim 1, wherein said metal substrate is one selected from the group consisting of steel plate, stainless steel plate, copper plate and aluminum plate.

4. A safety valve element for battery use according to claim 1, wherein said metal foil means is one selected from the group consisting of steel foil, stainless steel foil, copper foil, aluminum foil, nickel foil and nickel-iron alloy foil.

5. A battery provided with said safety valve element according to claim 1.

6. A battery case lid provided with a safety valve produced by forming an opening on a metal substrate, cold pressure welding a metal foil to said metal substrate so as to close said opening, and molding said metal substrate into said battery case lid.

7. A battery provided with said battery case having a battery case lid with a safety valve according to claim 6.

8. A battery case lid comprising a safety valve element, said safety valve element incorporating composite material consisting of a metal substrate which is provided with at least one perforated opening and metal foil directly stacked on with a surface thereof facing and united with a surface of said metal substrate by cold pressure welding substantially entirely along said facing surfaces so as to close said perforated opening, said metal foil having a thickness of 5–50 μm and rupturing only at an internal pressure greater than 20 kgf/cm$^2$.

9. The battery case lid of claim 8, wherein said metal substrate is selected from the group consisting of a steel plate, a stainless steel plate, a copper plate and an aluminum plate.

10. The battery case lid of claim 9, wherein said metal foil is selected from the group consisting of steel foil, stainless steel foil, copper foil, aluminum foil, nickel foil and nickel-iron alloy foil.

11. The battery case lid of claim 8, wherein said metal foil is selected from the group consisting of steel foil, stainless steel foil, copper foil, aluminum foil, nickel foil and nickel-iron alloy foil.

12. A safety valve element for battery use comprising a composite material of a metal substrate which is provided with a perforated opening and metal foil stacked and pressure welded by cold rolling in a vacuum on said metal substrate so as to close said perforated opening, wherein said metal substrate is nickel-plated steel and said metal foil is aluminum foil.

13. A battery case lid provided with a safety valve produced by forming an opening on a metal substrate, pressure welding a metal foil to said metal substrate so as to close said opening, and molding said metal substrate into said battery case lid, wherein said metal substrate is nickel-plated steel and said metal foil is aluminum foil.

14. A battery case lid, comprising a safety valve element, said safety valve element comprising an unetched composite material consisting of a metal substrate which is provided with at least one perforated opening and metal foil directly stacked on and united with said metal substrate so as to close said perforated opening, said metal foil having a thickness of 5–50 µm and being adapted to rupture only at an internal pressure greater than 20 kgf/cm$^2$, wherein said metal substrate is nickel-plated steel and said metal foil is aluminum foil.

* * * * *